United States Patent
Nguyen et al.

(10) Patent No.: US 9,864,786 B2
(45) Date of Patent: Jan. 9, 2018

(54) NATIVE FEDERATION VIEW SUGGESTION

(71) Applicant: Red Hat, Inc., Raleigh, NC (US)

(72) Inventors: Filip Nguyen, Brno (CZ); Filip Elias, Vysni Lhoty (CZ)

(73) Assignee: RED HAT, INC., Raleigh, NC (US)

( * ) Notice: Subject to any disclaimer, the term of this patent is extended or adjusted under 35 U.S.C. 154(b) by 449 days.

(21) Appl. No.: 14/537,356

(22) Filed: Nov. 10, 2014

(65) Prior Publication Data

US 2016/0132566 A1 May 12, 2016

(51) Int. Cl.
*G06F 17/30* (2006.01)

(52) U.S. Cl.
CPC ............... *G06F 17/30554* (2013.01)

(58) Field of Classification Search
CPC .................. G06F 17/30554; G06F 9/542
USPC ........ 709/224, 203, 204, 206, 221; 707/722, 707/706, 748, 754, 691, 710, 734, 737, 707/740, 741, 767, 769, 770, 776; 705/44, 14.15, 14.41, 14.54, 345, 7.23; 706/12, 46, 47

See application file for complete search history.

(56) References Cited

U.S. PATENT DOCUMENTS

| | | | | |
|---|---|---|---|---|
| 6,148,342 | A * | 11/2000 | Ho | G06F 21/6245 709/223 |
| 7,395,255 | B2 | 7/2008 | Li | |
| 8,019,771 | B2 | 9/2011 | Iwao | |
| 2008/0249981 | A1 | 10/2008 | Norring et al. | |
| 2010/0115100 | A1 | 5/2010 | Tubman et al. | |
| 2013/0124523 | A1 * | 5/2013 | Rogers | G06F 19/32 707/737 |
| 2013/0290374 | A1 | 10/2013 | Chand et al. | |
| 2014/0344622 | A1 * | 11/2014 | Huang | G06F 11/079 714/37 |

OTHER PUBLICATIONS

US 8,805,898, 08/2014, Mohan (withdrawn)
Data Integration-Migration, Synchronization, Federation; http://www.executionmih.com/data-management/integration-tool-migration-synchronization.php.
Maartin Bynens, Bart De Win, Wouter Joosen, Bart Theetan, Alcatel Bell; Ontology-Based Discovery of Data-Driven Services; 4 Pages; https://lirias.kuleuven.be/bitstream/123456789/131528/1/bynens-datadriven.pdf.
SQL Azure Federation—Introduction; 5 Pages; http://geekswithblogs.net/shaunxu/archive/2012/01/07/sql-azure-federation-ndash-introduction.aspx.
Ahmet Sayar, Geoffrey C. Fox, Marlon E. Pierce; Unified Data Access/Query Over Integrated Data-Views for Decision Making in Geographic Information Systems; 27 Pages; http://grids.ucs.indiana.edu/ptliupages/publications/asayar_bookchapter-sent.pdf.

* cited by examiner

*Primary Examiner* — Jay Morrison
*Assistant Examiner* — Ken Hoang
(74) *Attorney, Agent, or Firm* — Haynes & Boone LLP (57) ABSTRACT

Methods, systems, and computer program products for monitoring activity of data sources relating to data queries and data query responses, detecting events in the monitored activity, generating activity reports relating to the detected events; and analyzing the activity reports to determine view suggestions that may be used to optimize a federation engine.

20 Claims, 5 Drawing Sheets

NATIVE FEDERATION VIEW SUGGESTION

BACKGROUND

The present invention relates to database and database management systems, and more particularly to data federation.

A data federation system is a type of database management system (DBMS). In a data federation system, a federation engine may be coupled to a plurality of data sources from which the federation engine may access data. Queries for data stored in the plurality of data sources may be received by the federation engine from a plurality of clients. The federation engine may decompose each received query into sub-queries that are distributed to the plurality of data sources. The results of the sub-queries may be aggregated by the federation engine into result sets that are returned to the clients in response to the received queries.

A data federation system may be optimized by creating one or more re-usable "virtual" views that store aggregated results from the sub-queries. Data federation systems typically require a data architect to define the views.

One problem with data federation systems is that initial deployment of data federation software is a costly endeavor. An organization may be required to rewrite a large portion of its codebase to define data views.

BRIEF SUMMARY

According to one embodiment, a federated system comprises at least one processor in communication with a memory; a first data source that receives a query from a federation engine, determines a response to the query, and generates one or more events corresponding to the response; a first model monitor that monitors the first data source, detects an event of the one or more events corresponding to the response, and generates an activity report associated with the event; a second model monitor that monitors a second data source and detects one or more events associated with the second data source; and a view detector communicatively coupled to the first model monitor and the second model monitor, that is executable by the at least one processor, and that receives the activity report from the first model monitor in an event stream, analyzes the activity report and one or more other activity reports to detect similar activity reports, generates an n-tuple based on the similar activity reports, orders in the n-tuple either (i) the detected similar activity reports or (ii) identifiers of the detected similar activity reports, analyzes the n-tuple and one or more other n-tuples to detect similar n-tuples, and generates a view suggestion based on the similar n-tuples.

According to another embodiment, a computer-implemented method comprises monitoring activity of a data source; parsing the activity of the data source to detect one or more events, wherein an event of the one or more events corresponds to a response from the data source to a query received from a federation engine; generating an activity report for the event; analyzing the activity report and one or more other activity reports to detect similar activity reports; generating a view suggestion based on the detected similar activity reports.

According to yet another embodiment, a non-transitory computer-readable medium comprises computer-readable instructions, the computer-readable instructions executable by a processor to cause the processor to: monitor activity of a data source; parse the activity of the data source to detect one or more events, wherein an event of the one or more events corresponds to a response from the data source to a query received from a federation engine; generate an activity report for the first event; send the activity report from a model monitor to a view detector; analyze the activity report and one or more other activity reports to detect similar activity reports; generate an n-tuple based on the detected similar activity reports, wherein the detected similar activity reports or identifiers representing the detected similar activity reports are ordered in the n-tuple in ascending or descending time wise succession; analyze the n-tuple and one or more other n-tuples to detect whether the n-tuple and the one or more other n-tuples are similar and occur within a pre-defined time interval; and generate a view suggestion based on the detected similar n-tuples.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
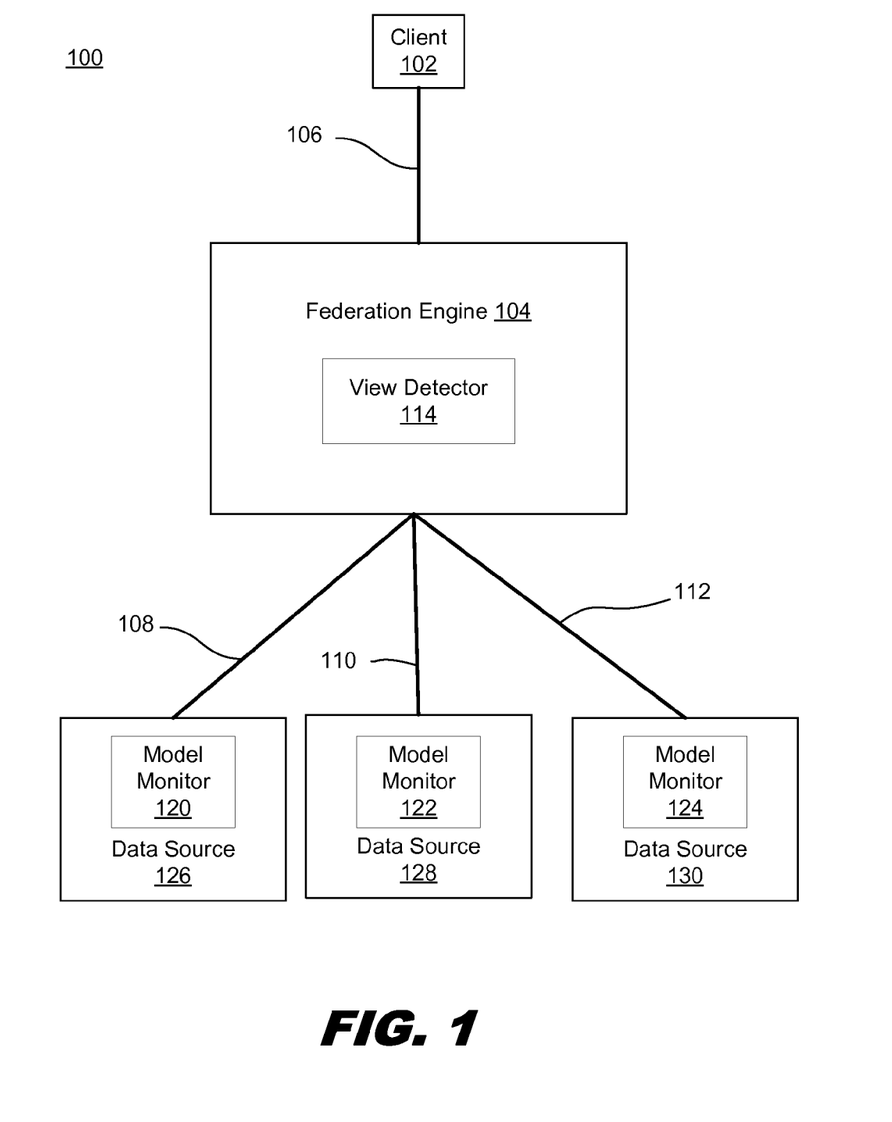
FIG. 1 is a block diagram illustrating a federated system architecture, in accordance with various examples of the present disclosure.

FIG. 1 illustrates an exemplary federated system architecture 100 in which examples of the present disclosure can be implemented. In federated system architecture 100, client 102 (e.g., user machine), a first data source 126, a second data source 128, a third data source 130 and federation engine 104 are communicatively coupled via connections 106, 108, 110 and 112 that represent any combination or physical and/or wireless connections. Each connection may be part of a network. A network may be a public network (e.g., the Internet), a private network (e.g., a local area network (LAN) or wide area network (WAN)), or a combination thereof. In an example, the network may include the Internet and/or one or more intranets, landline networks, wireless networks, and/or other appropriate types of communication networks. In an example, the network may comprise a wireless telecommunications network (e.g., cellular phone network) adapted to communicate with other communication networks, such as the Internet.

In an example, there may be one or more of each illustrated component (e.g., a plurality of clients, one data source, a plurality of data sources, and so forth).

Client 102 may be a computing device, such as a personal computer (PC), laptop, mobile phone, smart phone, smart television, tablet computer, or any other type of computing device. Client 102 may run an operating system (OS) that manages hardware and software of a respective machine. The operating system may be any standard or proprietary OS. A browser may run on the OS of a client. The browser may be a web browser that can access content and services provided by federation engine 104. Further, other types of software applications (e.g., applications, mobile applications, "apps") running on client 102 may provide access to content and services of federation engine 104 without the use of a browser. A user of client 102 may be a data architect, who performs queries and utilizes view detector 114 to assist in defining views for federation engine 104 to aggregate data from data sources 126, 128 and 130.

In the present example, data sources 126, 128 and 130 may each be a computing device that is configured with any standard or proprietary data store. For example, a data store may be an SQL-compliant database. In another example, a data store may be a flat file. Data stores may be homogenous or heterogeneous (e.g., data source 126 may be associated with an SQL-compliant database data store, data source 128 may be associated with a web service data store and data source 130 may be associated with a flat file data store).

Each data source 126, 128 and 130 may be a computing device such as a rackmount server, a router computer, a personal computer, a portable digital assistant, a mobile phone, a laptop computer, a tablet computer, a camera, a video camera, a netbook, a desktop computer, a media center, or any combination thereof. A computing device may be configured with one or more data stores.

Each computing device configured to include a data store may be structured with one or more applications that interact with the federation engine and retrieve data from one or more data stores, such as by receiving queries from federation engine 104, retrieving results from a data store and returning the results of the query to federation engine 104. In one example, a Java Database Connectivity (JDBC) API is implemented on a data source using a JDBC driver, in order for federation engine 104 to retrieve data from the data store using queries that conform to the JDBC API.

In the present example, federation engine 104 is structured as a federated database management system and is stored on a machine such as a rackmount server, a router computer, a personal computer, a portable digital assistant, a mobile phone, a laptop computer, a tablet computer, a camera, a video camera, a netbook, a desktop computer, a media center, or any combination thereof.

Federation engine 104 is structured to receive a federated query from a client (e.g., client 102), parse the federated query into sub-queries (e.g., a first sub-query for a first data source 126, a second sub-query for a second data source 126 and a third sub-query for a third data source 130), retrieve results for the sub-queries from the data sources, aggregate the sub-query results and present the aggregated sub-query results to the client using a federated view (i.e., a "virtual view").

In the present example, federation engine 104 includes view detector 114. View detector 114 is a component of federation engine 104 that is communicatively coupled with model monitors 120, 122 and 124 of data sources 126, 128 and 130. View detector 114 is structured to receive activity reports from model monitors 120, 122 and 124 via one or more event streams, in order to generate view suggestions. The view suggestions may be provided to federation engine 104, which is structured to communicate the one or more view suggestions to a data architect, who may be accessing federation engine 104 either locally, or remotely from a client (e.g., client 102).

In the present example, each data source 126, 128 and 130 is structured with a model monitor (model monitors 120, 122 and 124, respectively). Each model monitor may comprise a software module that is deployed to a data source that is configured with access to activity data relating to one or more data stores that are accessed by the data source.

Figure 2:
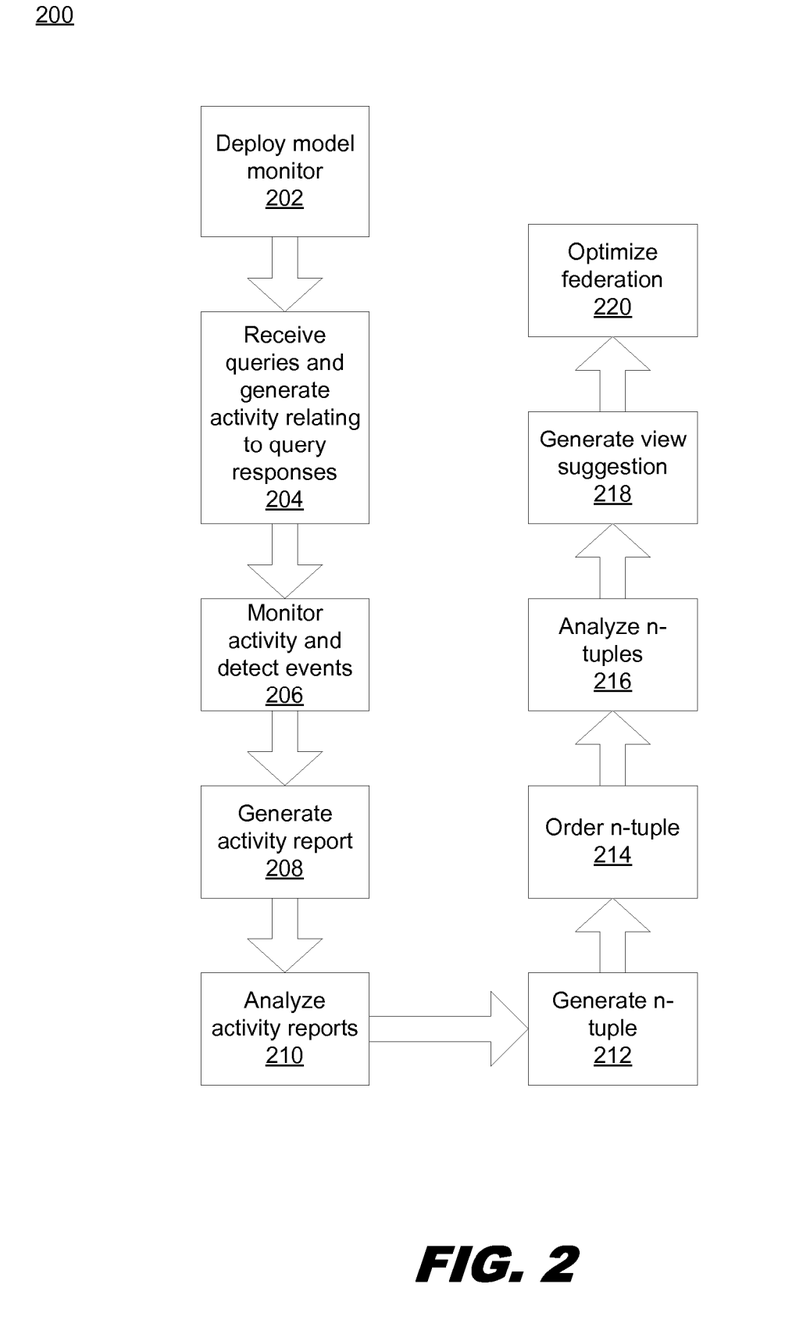
FIG. 2 is a flow diagram illustrating model monitoring, according to an example of the present disclosure.

FIG. 2 is a flow diagram illustrating model monitoring, according to an example of the present disclosure. The method 200 may be performed by processing logic that may comprise hardware (e.g., circuitry, dedicated logic, programmable logic, microcode), software (such as instructions run on a general purpose computer system, dedicated machine, or processing device), firmware, or a combination thereof.

At block 202, a model monitor is deployed to a data source, such as by installing model monitor software on the data source. The specific mechanism for deploying the model monitor may depend upon the type of data store configured to be accessed by the data source. For example, deploying the model monitor at a data source configured with a JDBC data store may include replacing a JDBC driver with the model monitor, such that the model monitor receives data queries from the federation engine, gathers file or database activity data relating to the data queries, processing the queries, receives data query responses, gathers file or database activity data relating to the data query responses and forwards the data query responses to the federation engine.

In another example, the model monitor is installed on a data source, such that the model monitor co-exists with an existing implementation for receiving queries and sending query responses. In this example, the model monitor may listen at a port of the data source, such as a port where outgoing responses to the data queries are sent to the federation engine and/or a port where queries are received from the federation engine.

At block 204, a federation engine sends a query to the data source. The query specifies that data from a particular data store of the data source is to be retrieved. The data source processes the query and generates a query response that contains the requested data. Activity of the data source may include file access activity (e.g., accessing a file to retrieve the data) and network activity (e.g., such as sending the response to the federation engine). Activity may comprise one or more discrete events. For example, if the data source accesses a file to retrieve data and sends the data to the federation engine, a first event may be the file access and a second event may be the sending of the data to the federation engine. A second query may be received and a response generated for that second query. A third event may be detected in the activity, the third event being the sending of a response to that query over the network.

At block 206, the model monitor monitors activity relating to access of data stores on the data source to detect the events. In this example, the monitored activity is: (i) file input and output activity and (ii) network activity of a specific type (e.g., JDBC traffic, outbound HTTP traffic). The model monitor parses the monitored activity to detect the separate events and parameters relating to those events.

The detected parameters for each event may include:
(i) a data store identifier (SID);
(ii) a protocol (e.g., HTTP, JDBC, FILE);
(iii) a description (e.g., which file, or which database and database table to which the event relates);
(iv) an originator (i.e., the identifier of the model monitor that detected the event);
(v) a size of the response to the query (e.g., JDBC result set size, HTTP response size, or number of bytes read from the file); and
(vi) a timestamp of the detection (i.e., the time that the model monitor detected the activity).

At block 208, the model monitor generates an activity report that includes the parameters. The particular parameters to include in the activity report may be user-configured.

In one example, the activity report is a tuple that comprises the detected parameters of the detected activity. For example, the generated activity report may be an ordered tuple of parameters as follows: (SID, protocol, description, originator, size, timestamp).

The activity report may be sent to the view detector via an event stream. The event stream may comprise a plurality of activity reports that are sent to the view detector in a time-ordered manner. For example, the activity reports may be sent as soon as they are generated. In another example, the activity reports may be delayed and sent at a later time.

At block 210, the view detector receives activity reports from one or more model monitors via one or more event streams. Each model monitor may have a separate event stream that communicatively couples the model monitor to the view detector. The activity reports may be received from the model monitors in high volume event streams. Accordingly, a complex event processing engine may be used for online processing of the high volume event streams.

The activity reports are analyzed by the view detector to detect activity report patterns. In one example, the view detector may detect patterns based on the timestamp parameter in the activity reports indicating that the events occurred within a user-configured time window. The time window may initially be set at a small number (e.g., 5 ms). The time window may be increased if a pre-configured minimum number of events (e.g., two events) are not located within that time window. The time window may be incrementally expanded by a pre-configured size until the desired number of events is detected or until a pre-configured time window size is reached (e.g., expanding the time window from 5 ms to 20 ms in increments of 5 ms until a pattern is detected).

In the present example, activity report patterns may include all events within the time window. In another example, further pattern recognition is used to determine events that have (i) an exact match of one or more of the following activity report parameters: source identifier, protocol, description and/or (ii) that have a near match regarding the size and/or timestamp parameters). Any or all of the parameters may be analyzed in the pattern recognition. In another example, the pattern recognition may identify all activity reports having the same SID and description parameters, timestamps within a time window and sizes within a pre-configured size window (e.g., sizes within 1 mb of one another). In another example, a pattern may be all activity reports that have near matches of the timestamp parameters.

In block 212, an n-tuple is generated that comprises either (i) activity reports of events that are determined to be a pattern or (ii) identifiers of the activity reports of events that are determined to be a pattern.

In block 214, the n-tuple is ordered. In the present example, each activity report in the in the n-tuple in time wise succession based upon the timestamp parameter. In another example, rather than the n-tuple being an ordered arrangement of activity reports, an identifier relating to each activity report may be arranged in the n-tuple. For example, the n-tuple may comprise a listing of the SID parameters of the activity reports, where the SIDs are arranged in time wise succession, in either ascending or descending order. According to this example, if a first activity report has a SID parameter SID1 and a second activity report has a later timestamp than the first activity report and a SID parameter that is SID2, the n-tuple may be (SID1, SID2).

At block 216 the n-tuples are analyzed to detect n-tuple patterns. In the present example, if the same n-tuple is found more than two times during a pre-configured interval (e.g., as according to the prior example, if (SID1, SID2) is located two times in a time interval), there may be a high probability that the n-tuple is a pattern that identifies related data events. In another example, instead of identifying n-tuples that are the same, the view detector may identify n-tuples that are similar, such as n-tuples that share one or more components that are exact matches or near exact matches.

In block 218, a view suggestion may be generated that comprises the n-tuples that are detected to be a pattern. In the present example, the n-tuple (SID1, SID2) is detected to be a pattern, as it occurs more than once in a pre-configured time interval. Therefore, the generated view suggestion in this example is (SID1, SID2).

The view suggestions may be stored such that a data architect may list and view all of the view suggestions. The data architect may define views based on the view suggestions. For example, the data architect may define a view that aggregates data from data stores that are frequently accessed together. A data architect may seek to create a number of views that such that views are available for many different combinations of data store data, but at the same time not create too many views such that a view is only used by one client for one query.

Each view suggestion includes an n-tuple and may also include least one conditionality relating to the n-tuple. Conditionality indicates a size of the data response in identified in an activity report in the n-tuple relative to the sizes indicated in the other activity reports in the n-tuple. For example, if a first activity report has a size parameter of 1 mb, and a second activity report has a size parameter of 4 mb, the conditionality of the first event is ⅕. The ratio may also be represented as the calculated percentage based on the ratio, in this example the percentage would be 20% for the first activity report. In this example, the conditionality for the second activity report in the n-tuple is ⅘, or 80%.

The conditionality attribute is important for determining which of the data stores in the n-tuple accounted for the largest amount of retrieved data.

In block 220, a data architect may use the view suggestions to optimize the federation system.

In one example, the data architect may deploy the model monitors for a period of time, such as several months in order to allow for enough time that standard operation of the federation engine may be determined. Once there are enough view suggestions to winnow view suggestion outliers, the data architect may optimize the federation engine, such as defining an optimal number of views, and caching or replicating frequently accessed data stores. In another example, a data architect may determine that a data store is frequently accessed and that the data store accounts for a large amount of data that is accessed. Restricting criteria may be implemented with respect to the data store.

One example of restricting criteria that may be attached to a data store in order to optimize the view for the data store is dependent join. For example, there may be a first data store with millions of records and a second data store with a thousand records. The data stores may be frequently accessed together. Prior to optimization, all records from both data stores may be retrieved by the federation engine and joined in memory at the federation engine to create a view that contains all of the records of the first and the second data stores. Once the view is created, it may then be queried to determine query results. Such a retrieval and join of millions of records may be expensive in terms of processing and network traffic.

In this example, the data architect may be alerted to the frequent accessing of the first and the second data store by a view suggestion. Accordingly, the data architect may see that the view suggestion indicates that the conditionality of the first data store is large compared with the conditionality of the second data store. In light of the view suggestion, the data architect may decide to optimize the access of the first and the second data stores by attaching restricting criteria to the first data store, which is much larger than the second data store.

In this example, the restricting criteria include a dependent join of the data stores. The dependent join may require that data from the first data store be queried to determine a result data set. The result data set may be sent to the federation engine rather than the entire data set from the first data store. The dependent join may therefore result in fewer records being sent across the network, and additionally result in fewer records needing to be joined with the records of the second data store at the federation engine. The restricting criteria in this example result in reducing network bandwidth and processing time, which is an optimization of the federation system.

Figure 3:
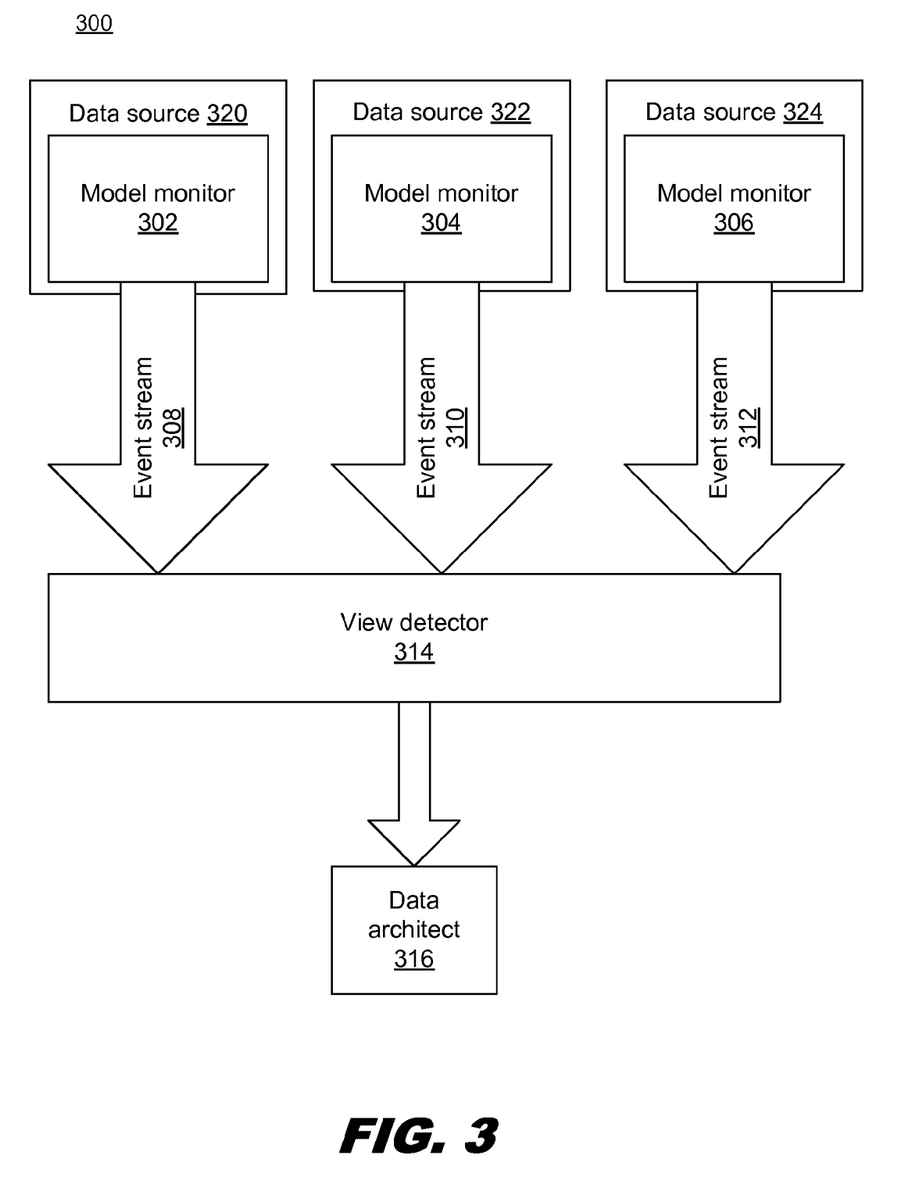
FIG. 3 is a block diagram illustrating a model monitor architecture, in accordance with various examples of the present disclosure.

FIG. 3 illustrates an exemplary model monitor architecture 300 in which examples of the present disclosure can be implemented.

Model monitors 302, 304 and 306 each are assigned to a different data source. For example, model monitor 302 monitors data source 320, model monitor 304 monitors data source 322, and model monitor 306 monitors data source 324.

Each model monitor parses activity from its respective data source to determine events. Each of these events may be formatted as a tuple comprising components relating to the event. The tuple may be referred to as an activity report.

Event streams 308, 310, and 312 represent the streams of the activity report tuples from each of the model monitors. For example, the activity reports for the events detected by model monitor 302 are transmitted to view detector 314 via event stream 308. The activity reports for the events detected by model monitor 304 are transmitted to view detector 314 via event stream 310. The activity reports for the events detected by model monitor 306 are transmitted to view detector 314 via event stream 312.

View detector 314 analyzes the activity reports using pattern recognition to determine view suggestions. These view suggestions may be presented to data architect 316. Data architect 316 represents one or more users who review the view suggestions.

Figure 4:
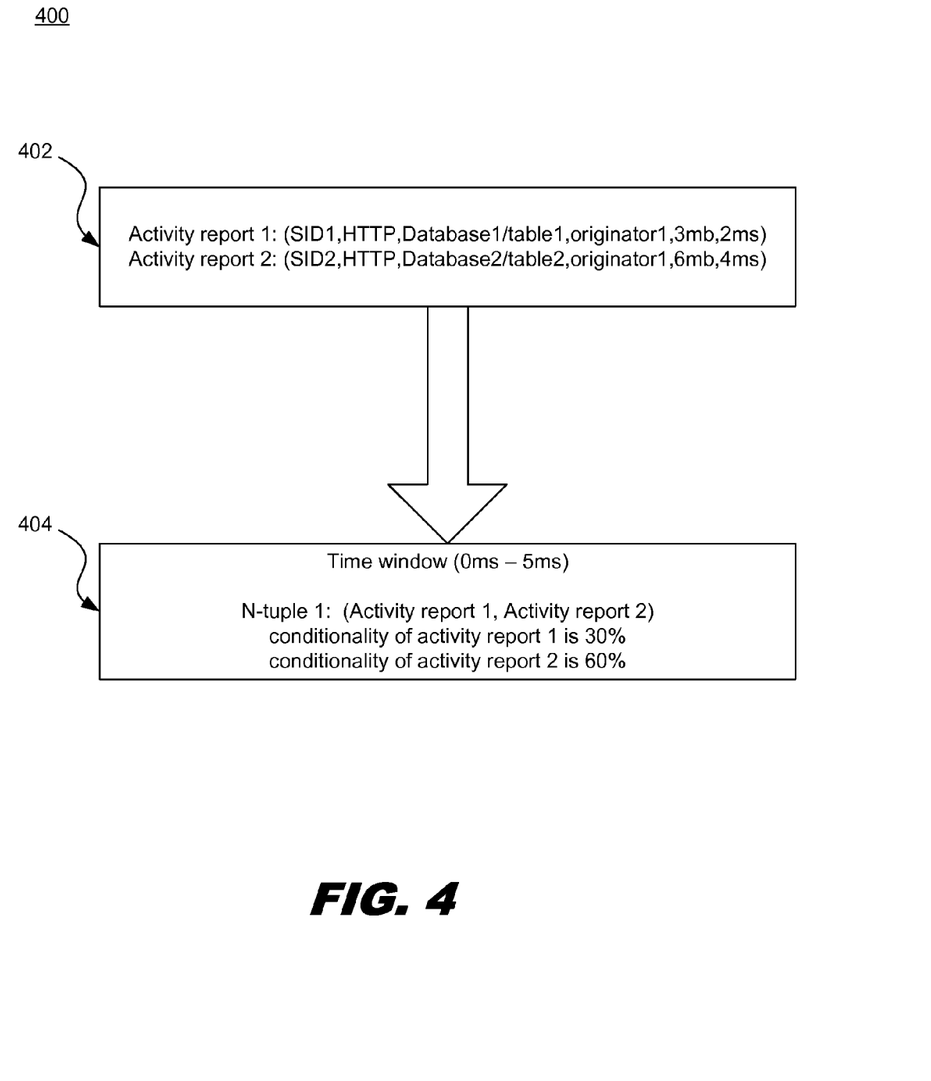
FIG. 4 is a flow diagram illustrating view suggestion generation, according to an example of the present disclosure.

FIG. 4 is a flow diagram illustrating view suggestion generation, according to an example of the present disclosure. The method 400 may be performed by processing logic that may comprise hardware (e.g., circuitry, dedicated logic, programmable logic, microcode), software (such as instructions run on a general purpose computer system, dedicated machine, or processing device), firmware, or a combination thereof.

Block 402 represents an example of a detecting of a first event and a second event that occur within a 5 ms time window. As seen in block 402, each of the events is shown in an activity report tuple structure, with each activity report tuple comprising a comma separated listing of components of its event. In the present example, components of each activity report include the SID, protocol, description, originator, size and timestamp. In the present example, the events are determined to be a pattern as activity report 1 and activity report 2 are detected to occur within 5 milliseconds (ms) of one another (i.e., Activity report 1 has a timestamp of 2 ms and activity report 2 has a timestamp of 4 ms).

Accordingly, at block 404, an n-tuple is generated that includes a time wise succession of the activity reports that are detected to be an event pattern. Activity report 1 is ordered prior to activity report 2 because activity report 1 has a timestamp that is less than the timestamp of activity report 2. In another example, the activity reports may be ordered according to another component, or may be ordered in either increasing or decreasing order. In this example the timestamps are displayed in a simplified format. The timestamps may be much longer and indicate year, month, day, hour and minute information in addition to millisecond data. Timestamps may be in any format that allows the view detector to determine activity reports that were detected within a time window. Instead of an n-tuple being an ordered listing of activity reports, the n-tuple may be an ordered listing of identifiers pertaining to the activity reports, such as an ordered listing of activity report SIDs.

Conditionality is determined for the n-tuple, which represents the size difference between the events. In the present example, the size component of activity report is 3 mb and the size component of activity report 2 is 6 mb. Accordingly, the conditionality determined for activity report 1 is 30% and the conditionality determined for activity report 2 is 60%. Conditionality may be represented as a ratio or a percentage.

Figure 5:
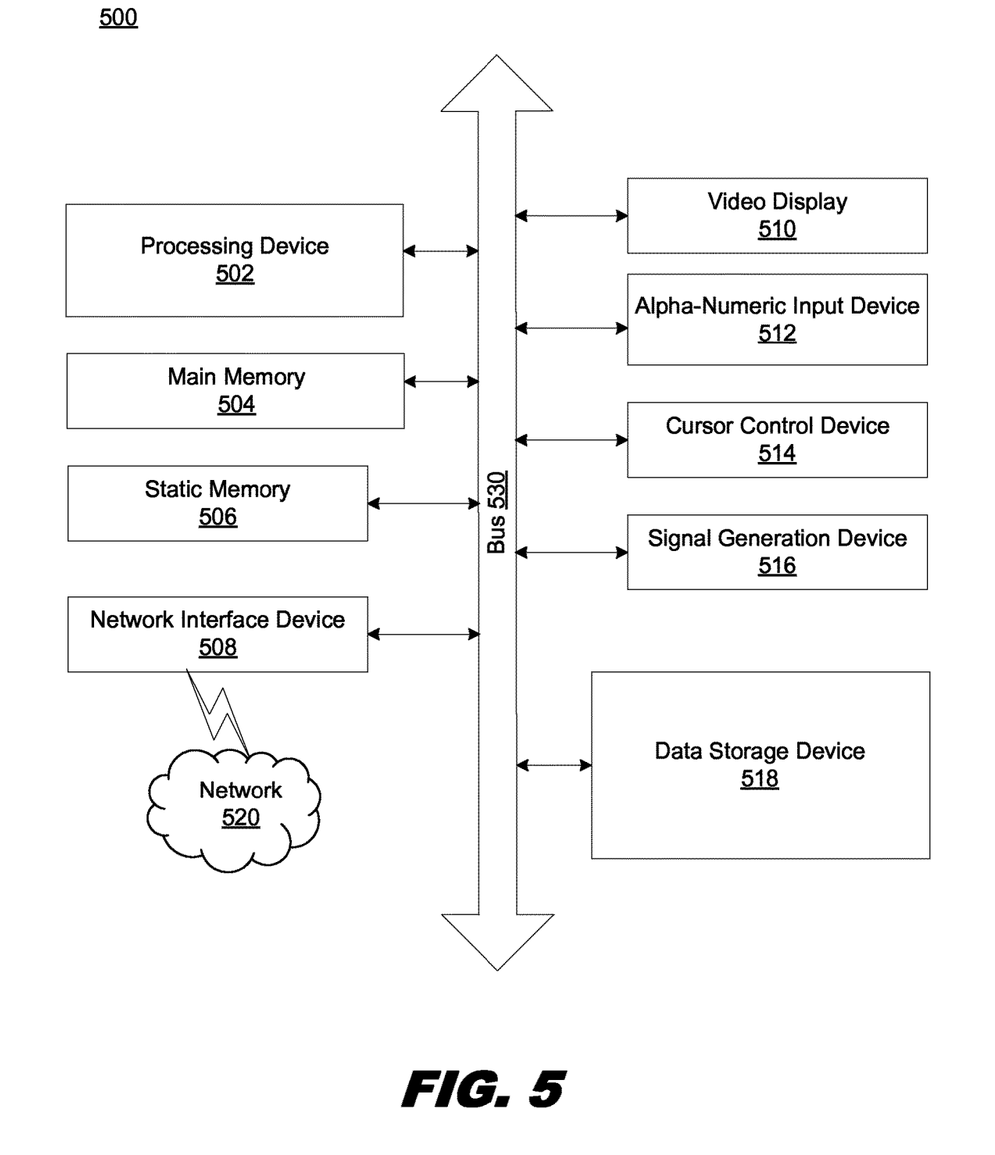
FIG. 5 is a block diagram illustrating an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Exemplary computer system 500 includes processing device (processor) 502, main memory 504 (e.g., read-only memory (ROM), flash memory, dynamic random access memory (DRAM) such as synchronous DRAM (SDRAM), double data rate (DDR SDRAM), or DRAM (RDRAM), and so forth), static memory 506 (e.g., flash memory, static random access memory (SRAM), and so forth), and data storage device 518, which communicate with each other via bus 530.

Processor 502 represents one or more general-purpose processing devices such as a microprocessor, central processing unit, or the like.

More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions for performing the operations and steps discussed herein.

Computer system 500 may further include network interface device 508.

Computer system 500 also may include video display unit 510 (e.g., a liquid crystal display (LCD) or a cathode ray tube (CRT)), alphanumeric input device 512 (e.g., a keyboard), cursor control device 514 (e.g., a mouse), and signal generation device 516 (e.g., a speaker).

Data storage device 518 may include a computer-readable storage medium on which is stored one or more sets of instructions (e.g., software) embodying any one or more of the methodologies or functions described herein. The instructions may also reside, completely or at least partially, within main memory 504 and/or within processor 502 during execution thereof by computer system 500, main memory 504 and processor 502 also constituting computer-readable storage media. The instructions may further be transmitted or received over network 520 via network interface device 508.

While data storage device 518 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A federated system, comprising:
   at least one processor in communication with a memory;
   a first data source that receives a query from a federation engine, determines a response to the query, and generates one or more events corresponding to the response;
   a first model monitor that monitors the first data source, detects an event of the one or more events corresponding to the response, and generates an activity report associated with the event;
   a second model monitor that monitors a second data source and detects one or more events associated with the second data source; and
   a view detector communicatively coupled to the first model monitor and the second model monitor, the view detector executable by the at least one processor to:
      receive the activity report from the first model monitor in an event stream;
      analyze the activity report and one or more other activity reports to detect similar activity reports, the analyzing including detecting the similar activity reports within a time window that is expanded by a pre-configured amount of time until a threshold is reached;

generate an n-tuple based on the similar activity reports;
order in the n-tuple either (i) the detected similar activity reports or (ii) identifiers of the detected similar activity reports;
analyze the n-tuple and one or more other n-tuples to detect similar n-tuples; and
generate a view suggestion based on the similar n-tuples, wherein the view suggestion comprises a suggestion to define a federated view at the federation engine, and wherein the defined federated view includes cached data from the first data source and the second data source.

2. The federated system of claim 1, wherein the first activity report is a tuple comprising the following components: a data store identifier, a protocol identifier, a file identifier or a database identifier, a model monitor identifier, a size of the response from the first data source to the query, and a timestamp.

3. The federated system of claim 1, wherein the n-tuple is associated with at least one conditionality, wherein the at least one conditionality represents a relation between size components of the detected similar activity reports that are ordered in the n-tuple.

4. The federated system of claim 1, wherein the view suggestion is generated based on the similar n-tuples being located within a pre-configured time interval.

5. The federated system of claim 3, wherein the conditionality is a ratio or a percentage.

6. The federated system of claim 1, wherein the view suggestion is presented to one or more users.

7. The federated system of claim 1, wherein the one or more events corresponding to the response are at least one of the following event types: (i) file input and output activity; and (ii) network activity.

8. A computer-implemented method comprising:
monitoring query response activity of a data source, wherein the query response activity comprises at least one of the following: (i) file input; (ii) file output; and (iii) network traffic;
parsing the query response activity of the data source to detect an event and one or more event components associated with the event;
generating an activity report for the event comprising at least one of the one or more event components;
analyzing the activity report and one or more other activity reports to detect similar activity reports, the analyzing including detecting the similar activity reports within a time window that is incrementally expanded by a pre-configured amount of time until the time window reaches a threshold amount of time; and
generating a view suggestion based on the detected similar activity reports, wherein the view suggestion comprises a suggestion to define a federated view that includes aggregated data from the data source and a second data source.

9. The method of claim 8, wherein the activity report is a tuple comprising the following components: a data store identifier, a protocol identifier, a file or database identifier, an originator identifier, a size of the response from the data source to the query, and a timestamp.

10. The method of claim 8, wherein the view suggestion is associated with at least one conditionality, wherein the at least one conditionality represents a relation between size components of the detected similar activity reports.

11. The method of claim 8, wherein the view suggestion is presented to one or more users.

12. The method of claim 8, wherein the one or more events are at least one of the following event types: (i) JDBC related file input or output activity; and (ii) outbound HTTP network traffic.

13. The method of claim 8, further comprising:
generating an n-tuple based on the detected similar activity reports;
analyzing the n-tuple and one or more other n-tuples to detect similar n-tuples; and
generating the view suggestion based on the detected similar n-tuples.

14. The method of claim 13, wherein the view suggestion is generated based on the detected similar n-tuples being associated with one or more timestamps indicating that the detected similar n-tuples represent events that occurred within a pre-configured time interval.

15. A non-transitory computer-readable medium comprising computer-readable instructions, executable by at least one processor perform operations comprising:
monitoring activity of a data source;
parsing the activity of the data source to detect one or more events, wherein an event of the one or more events corresponds to a response from the data source to a query received from a federation engine;
generating an activity report for the first event;
sending the activity report from a model monitor to a view detector;
analyzing the activity report and one or more other activity reports to detect similar activity reports, the analyzing including detecting the similar activity reports within a time window that is incrementally expanded until a threshold is reached;
generating an n-tuple based on the detected similar activity reports, wherein the detected similar activity reports or identifiers representing the detected similar activity reports are ordered in the n-tuple in ascending or descending time wise succession;
analyzing the n-tuple and one or more other n-tuples to detect whether the n-tuple and the one or more other n-tuples are similar and occur within a pre-defined time interval; and
generating a view suggestion based on the detected similar n-tuples, wherein the view suggestion comprises a suggestion to define a federated view that includes aggregated data from the data source and a second data source.

16. The medium of claim 15, wherein the activity report is a tuple comprising the following components: a data store identifier, a protocol identifier, a file or database identifier, a model monitor identifier, a size of the response from the data source to the query, and a timestamp.

17. The medium of claim 15, wherein the view suggestion is associated with at least one conditionality, wherein the at least one conditionality represents a relation between size components of the detected similar activity reports.

18. The medium of claim 15, wherein the view suggestion is presented to one or more users.

19. The medium of claim 15, wherein the one or more events are determined to relate to file input and output activity.

20. The medium of claim 15, wherein the one or more events are determined to relate to network activity.

* * * * *